United States Patent

Anderson

[15] 3,668,332

[45] June 6, 1972

[54] MAGNETIC RECORDING HEAT WHICH ACCURATELY DEFINES THE WIDTH OF THE RECORDING TRACK

[72] Inventor: Harold M. Anderson, Los Angeles, Calif.

[73] Assignee: Xerox Corporation, Stamford, Conn.

[22] Filed: Aug. 26, 1970

[21] Appl. No.: 66,930

[52] U.S. Cl. ..................................179/100.2 C, 340/174.1 F
[51] Int. Cl. ..........................................................G11b 5/26
[58] Field of Search..............................179/100.2 C, 100.2 D; 340/174.1 F; 346/74 MC

[56] References Cited

UNITED STATES PATENTS

| | | | |
|---|---|---|---|
| 3,514,851 | 6/1970 | Perkins et al. | 179/100.2 C |
| 3,155,949 | 11/1964 | Tibbetts | 179/100.2 D |
| 3,132,214 | 5/1964 | Welsh | 179/100.2 D |

*Primary Examiner*—Bernard Konick
*Assistant Examiner*—Alfred H. Eddleman
*Attorney*—James J. Ralabate, John E. Beck, Franklyn C. Weiss and Irving Keschner

[57] ABSTRACT

A magnetic recording head having a read-write gap and an erase gap adjacent a common core. The read-write gap is of a predetermined width equal to or less than the width of the common core. Within the common core, in the surface adjacent the erase gap, there is a notch of predetermined width less than the predetermined width of the read-write gap. The notch is of sufficient depth to minimize the erase function of that portion of the erase gap opposite thereto. In operation, the initial width of the magnetically recorded information, as determined by the width of the read-write gap, is cropped to the predetermined width of the notch during erasure. Accurately defined tracks of extremely narrow width may be attained with this recording head thereby permitting an increase in the number of tracks recorded per unit with of the magnetic storage medium.

22 Claims, 5 Drawing Figures

INVENTOR.
HAROLD M. ANDERSON,

By Joseph Hirsch
ATTORNEY.

MAGNETIC RECORDING HEAT WHICH ACCURATELY DEFINES THE WIDTH OF THE RECORDING TRACK

BACKGROUND OF THE INVENTION

The present invention relates to magnetic recording apparatus and, more particularly, to a recording head for recording information, in magnetic form, in tracks of predetermined, and potentially narrow, width. Furthermore, this invention describes a magnetic recording head which combines a read-write gap and a trailing erase gap, of specific configuration, in a single unitary structure.

In present day recording applications, it is considered important to store data at relative high storage densities in the magnetic storage medium. Since overlap of adjacent "bit" areas in the storage medium results in a deterioration of the data read-in and read-out performance, it is highly desirable to sharply and accurately define a very limited area of the storage medium which defines individual data storage locations.

In magnetic disc recording wherein the recording tracks are closely spaced to adjacent recording tracks, accurate track definition is an absolute necessity. All other factors being constant, to increase the storage density in recording systems in this type, it is necessary to position adjacent tracks closer together. As the tracks are brought closer together, however, the need to accurately define the data storage location and, particularly, the width of the recorded track becomes extremely critical. To the extent that the track is ill defined, the read-out performance will be erratic due to interference from the magnetized portions of the recorded tracks adjacent to the particular data storage location being interrogated. Accordingly, it would be desirable to have a magnetic recording head which accurately defines the recorded track width in a manner which enables an increase in the number of tracks which can be recorded per unit width of the magnetic storage medium.

OBJECTS OF THE INVENTION

It is, therefore, the primary object of the present invention to provide a magnetic recording head which sharply defines the data storage location.

It is a further object of the present invention to provide a magnetic recording head which accurately defines the width of the recording track.

It is a further object of the present invention to provide a magnetic recording head which enables a recorded track of initial width to be narrowed to the final width desired, thereby permitting more tracks to be recorded per unit width of the magnetic storage medium.

Yet a still further object of the present invention is to provide a unitary magnetic recording head wherein the final width of the recorded track is accurately defined by the erase portion thereof.

These and still further objects, features and advantages of the present invention will become apparent upon consideration of the following detailed disclosure.

BRIEF SUMMARY OF THE INVENTION

These and still further objects, features and advantages of the present invention are achieved, in accordance therewith, by providing a magnetic recording head having a read-write leg, an erase leg, and a common core therebetween. The read-write leg and the erase leg are each separated, at the lower portion thereof, from the common core by a small gap in which, upon appropriate energization of the read-write or erase coils about the respective legs, fringing magnetic fields are generated. These fields cause information to be stored, reproduced or erased from individually-defined data storage locations on a magnetic recording medium therebeneath. As is well known in the art, the gaps between the common core and the read-write and erase legs can be filled with non-magnetic spacers (i.e., shims) which do not adversely affect the generation of the fringing magnetic fields. Such spacers or shims are preferred, however, since they cause the fringing fields to be forced outwardly, i.e., generally in a direction toward the adjacent recording surface.

To achieve the objectives stated above, the read-write leg is of a predetermined width equal to or less than the width of the common core. During recording, the width of each data storage location, or the width of a magnetized track, will be equal, or substantially equal, to this predetermined width.

The common core also has a notch in the lower portion thereof facing the erase gap. Preferably, this notch is symmetrically placed within that surface of the common core which faces the erase gap. The notch is of a predetermined width which is less than the predetermined width of the read-write leg. Additionally, the notch is sufficiently deep to minimize the erase function of that portion of the erase gap opposite thereto (i.e., for the width of the notch). Thus, for the predetermined width of the notch there will be no erasure of information previously recorded by the read-write gap. On each side of the notch between the edge of the notch and the outer edge of the common piece, information recorded by the read-write gap will be erased to the extent that any is present. Thus, by means of the notch positioned within the common core adjacent the erase gap, the width of the recorded information is cropped to the predetermined width of the notch. In this manner, it is possible to accurately define recording tracks of extremely narrow width thereby permitting a greater number of tracks to be recorded per unit width of the magnetic storage medium.

The magnetic recording head described above is, essentially, an on-line device for magnetically recording information and then partially erasing the outer edges of the information recorded. Since it is an on-line device, it can be fabricated in extremely narrow widths which enable the associated recording system to attain the increase in the number of recorded tracks referred to above. This is in contrast to the positioning or straddling of erase heads on each side of the recording head which, because of the width added to the recording head, reduces the number of tracks which can be recorded per unit width of the magnetic storage medium. Additionally, where separate erase heads are positioned on opposite sides of the recording head, it has been found to be virtually impossible to position the erase heads properly with respect to one another and/or the read-write head. This problem is obviated by the present invention wherein the notch adjacent the erase gap is also utilized, during fabrication of the recording head, to properly position the read-write leg with respect to the notch, thereby assuring the desired definition of the final width of the data storage location.

BRIEF DESCRIPTION OF THE DRAWINGS

The nature of the invention will be more easily understood when it is considered in conjunction with the accompanying drawings wherein:

Referring to FIGS. 1–3, there is seen a magnetic recording head 10 having a read-write leg 12 and an erase leg 14, separated by a common core 16 therebetween. The upper portions of read-write leg 12 and erase leg 14 are in actual, or virtual, contact with the adjacent upper portion of common core 16. A read-write coil 18, which can be energized in accordance with well-known recording and read-out techniques, is wound about one portion of read-write leg 12. In a similar fashion, an erase coil 20 is wound about a portion of erase leg 14. Erase coil 20 can be, for example, connected to a DC power supply and energized, for erasure purposes, in accordance with well-known erasure techniques. REad-write leg 12 is separated, at the lower portion thereof, from common core 16 by a small gap 22, for example, on the order of about 100 microinches, from common core 16. As is well-known in the art, a non-magnetic spacer 24 can be positioned with gap 22. Erase leg 14 is also separated from common core 16 by a small gap 26, for example, on the order of about 500 microinches across. A non-magnetic spacer 28 can also be positioned within gap 26.

Figure 1:
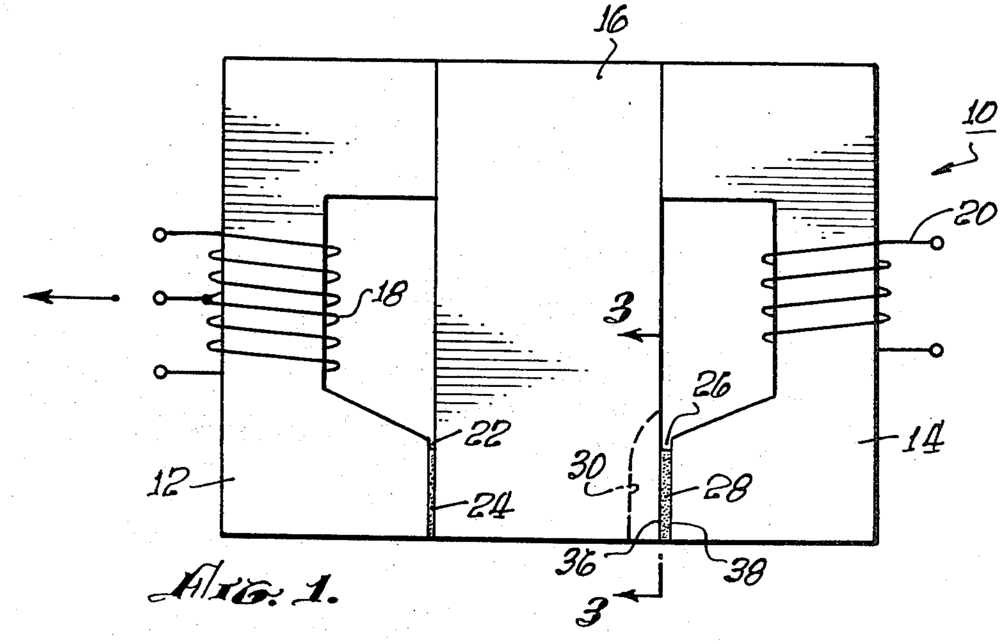
FIG. 1 is a side elevational view of a magnetic recording head produced in accordance with the teachings of the present invention.

Opposite erase gap 26 in the lower portion of common core 16 is a notch 30 which, in a manner to be described below, will eventually define the width of the recorded track or the individual data storage locations. Due to its small size, the notch has a slightly rounded inner surface, through this is neither critical nor desirable or undesirable. The function of the notch is to eliminate the erasing capability of that portion of the erase gap opposite thereto. The notch should have a minimum depth, for example, on the order of about 10–20 times the thickness of the erase gap (i.e., the distance between surface 36 of core 16 and surface 38 of erase leg 14).

Figure 2:
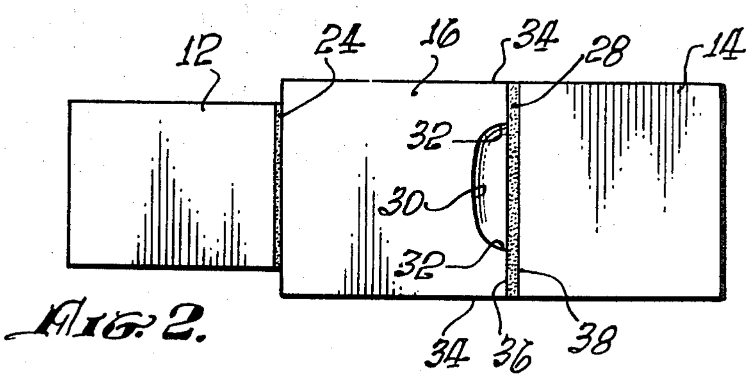
FIG. 2 is a bottom view of the magnetic recording head of FIG. 1.

As can best be seen in FIG. 2, read-write leg 12, the read-write gap 22 and, optionally, the non-magnetic spacer 24 therein, are of a predetermined width which, in terms of magnetic recording, can be extremely narrow, for example, as narrow as about 3 mils. This predetermined width can be equal to or less than the width of the common core 16. Notch 30, which is preferably symmetrically placed within that surface of common core 16 facing erase gap 26, is of a predetermined width somewhat less than the width of read-write leg 12.

In operation, the magnetically recorded track will have an initial width equal to the width of read-write gap 22. As the recording head moves relative to the magnetic recording medium in the direction as shown by the arrow in FIG. 1 and, upon appropriate energization of erase coil 20, those areas between the edges 32 of notch 30 and the outer edges 34 of common core 16 will be erased to the extent that any information has been recorded therein. Notch 30 because of its depth reduces the erasing field, over the preselected width of the notch, to a point where the information previously recorded across that width will not be erased. In this manner, a recorded track of a width narrower than the initially recorded width is attained.

An exemplary magnetic recording head has a 4 mil wide read-write leg 12, a 4 mil wide non-magnetic spacer 24, a 5 mil wide common core 16, a 3 mil wide notch, a 5 mil wide non-magnetic space 28 and a 5 mil wide erase leg 14. The 4 mil wide read-write leg 12 and the 3 mil wide notch 30 are symmetrically positioned with respect to the longitudinal axis of the magnetic recording head. Thus, in operation, the magnetically recorded track 4 mils wide will be reduced to a track 3 mils wide by erasure of the outer one-half mil of recording on each side of the longitudinal axis of the recording head. With such a head, approximately 200 tracks per linear inch of width of the magnetic recording medium can be recorded. These tracks will be on 5 mil centers, with a 3 mil recording area and a 2 mil non-recording area separating adjacent magnetized areas.

The magnetic recording head described above defines, with its unique structure, the lateral boundaries between adjacent recording tracks and, because of the extremely narrow width afforded thereby, the narrow center to center spacing necessary for high density magnetic recording. It should be understood, of course, that the front and rear boundaries of each data storage location along the individual tracks are defined by the manner in which the read-write coil is pulsed to store information in the magnetic storage medium as the magnetic storage medium moves relative to the recording head of the present invention.

Figure 3:
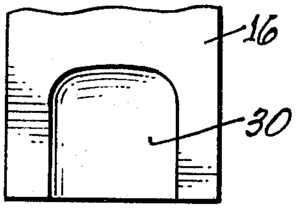
FIG. 3 is an elevational view of the track width-defining notch taken along line 3—3 of FIG. 1.

The exemplary magnetic recording head shown in FIGS. 1–3 is assembled, as can be seen, from three major, individual pieces (disregarding the non-magnetic shims). If found desirable, the recording head can be fabricated from a single piece though this may present difficult fabrication problems especially when considering magnetic recording heads of extremely small size. Additionally, a one-piece structure does not permit manipulative adjustment of the read-write leg with respect to the notch to give the symmetrical orientation about the longitudinal axis of the recording head. However, to the extent that this can be "built-in" during fabrication, one-piece recording heads may be found to be equally suitable.

Figure 4:
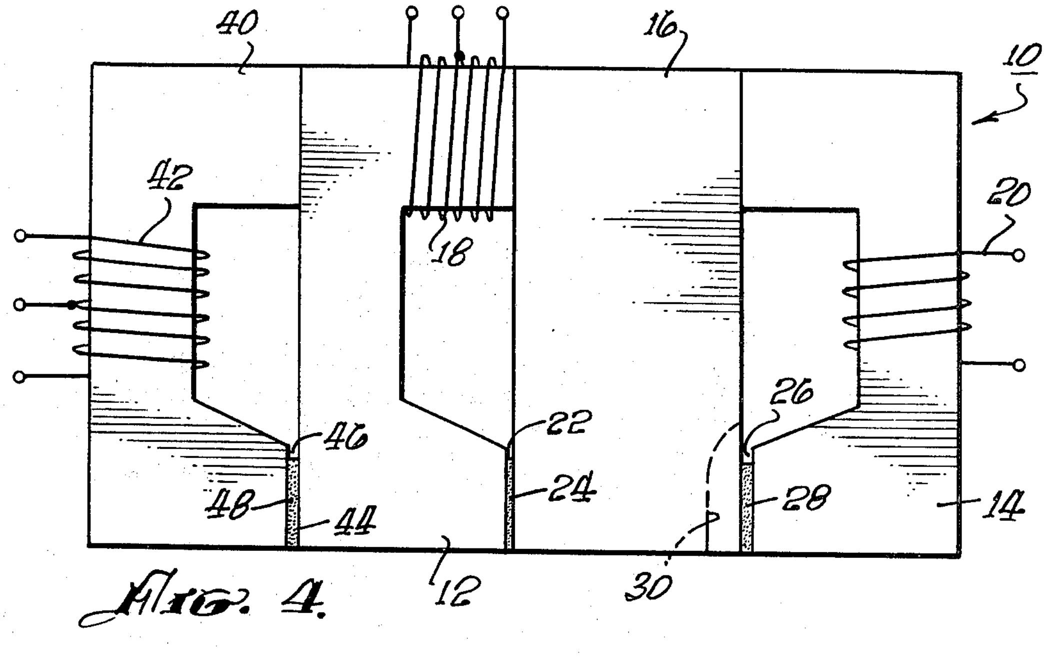
FIG. 4 is a side elevational view of an alternate magnetic recording head produced in accordance with the teachings of the present invention.
Figure 5:
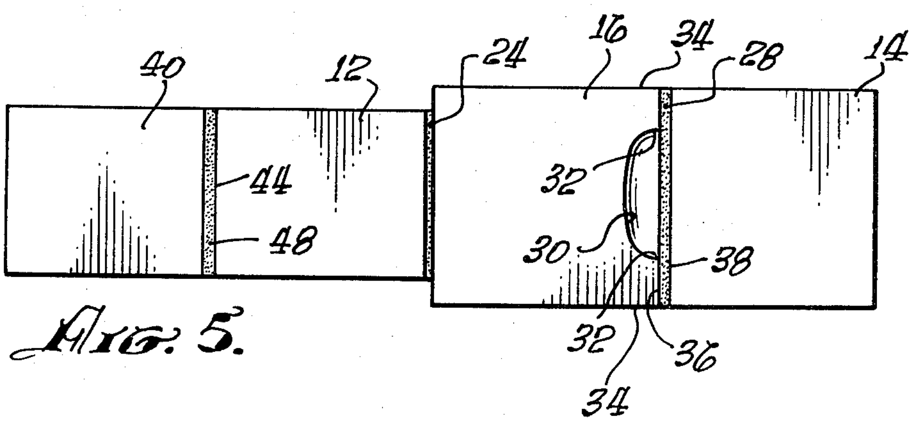
FIG. 5 is a bottom view of the magnetic recording head of FIG. 4.

Referring to FIGS. 4 and 5, there is seen an alternate embodiment of the magnetic recording head of the present invention. Like numerals have been utilized to identify like parts as shown in FIGS. 1–3. This embodiment incorporates the feature of pre-erase which places the adjacent portion of the magnetic recording medium in a substantially uniform state prior to the recording of information, in magnetic form, thereon. This is achieved by positioning a third or pre-erase leg 40, having a pre-erase coil 42 wound about one portion thereof, ahead of read-write leg 12. To accommodate this third leg, read-write coil 18 is repositioned about the upper portion of read-write leg 12, as opposed to the intermediate portion thereof as shown in FIG. 1. Pre-erase leg 40 is separated, at the lower portion thereof, from surface 44 of read-write leg 12 by a small gap 46, for example, on the order of about 500 micro-inches. As with the other gaps, a non-magnetic spacer 48 can also be positioned within gap 46.

As the magnetic recording medium moves relative to the magnetic recording head of FIGS. 4 and 5 and, upon appropriate energization of pre-erase coil 42, a track on the adjacent magnetic recording medium will be magnetized to a substantially uniform condition in accordance with well-known techniques in the art to which this invention pertains. As shown, the width of this track will be equal, or substantially equal, to the width of gap 46 which, in this embodiment, is equal to the width of read-write gap 22. Thereafter, the operation of the magnetic recording head of this embodiment is in accordance with that described above with respect to FIGS. 1–3.

Other features well-known in the art in designing magnetic recording heads can be incorporated into the present invention, as will be apparent to one skilled in this art. For example, the edges of the read-write and erase legs can be tapered adjacent the leading and trailing edges of the magnetic recording head to minimize extraneous pick-up from other recorded areas; etc.

While the invention has been described with reference to a specific embodiment thereof, it will be understood by those skilled in the art that various changes in form and detail may be made without departing from the true spirit and scope of the invention. Accordingly, all substitutions, additions, and/or modifications of the present invention, or to which the present invention is readily susceptible without departing from the true spirit and scope of this disclosure, and considered part of the present invention.

What is claimed is:

1. A magnetic recording head comprising means for magnetizing an area of an adjacent magnetic storage medium by a first portion of said recording head of a first predetermined width, means integrally associated with a second portion of said recording head of a second predetermined width greater than said first predetermined width for reducing the width of the magnetized area to a width less than said first predetermined width, said width reducing means including the lower portion of a surface of a magnetic core of said second predetermined width facing an erase gap in said second portion, said lower portion having a notch therein facing said erase gap, said notch being of sufficient depth into the magnetic core to eliminate the erasing capability of that portion of the erase gap opposite thereto, said notch having a width less than said first predetermined width whereby magnetically recorded areas between each end of said notch and the lateral ends of said erase gap adjacent thereto will be erased upon energization of said width reducing means.

2. The magnetic recording head of claim 1 wherein said magnetizing means in said first portion of said notch in said second portion are symmetrically positioned with respect to the longitudinal axis of said magnetic recording head.

3. The magnetic recording head of claim 1 further including pre-erase means associated with a third portion of said recording head, said pre-erase means having a width at least equal to the width of said magnetizing means in said first portion, said pre-erase means adapted to bring portions of said magnetic recording medium adjacent thereto to a substantially uniform condition prior to the recording thereon of information by said magnetizing means.

4. A magnetic recording head comprising a central magnetic core having a plurality of legs, a read-write coil disposed about a first leg, an erase coil disposed about a second leg, the end of each of said legs adjacent the lower portion of said magnetic core being slightly spaced from said magnetic core to respectively define a read-write gap and an erase gap, said first leg having a first predetermined width less than the width of said magnetic core thereby defining said read write gap, that portion of the surface of said magnetic core facing said erase gap being of a predetermined width greater than the width of said read-write gap and having a notch therein, said notch being of sufficient depth into said magnetic core to eliminate the erasing capability of that portion of said erase gap opposite thereto whereby, upon energization of said read-write coil when said read-write gap is positioned adjacent a magnetic storage medium, a data area of said first predetermined width is magnetically recorded thereon and, as said magnetized data area of said first predetermined width is positioned adjacent said erase gap and upon energization of said erase coil, the width of said magnetized data area is reduced to the smaller width of said notch by erasure of those magnetized areas between each end of said notch and the lateral ends of said erasure gap adjacent thereto.

5. The magnetic recording head of claim 4 wherein said read-write gap and said notch are symmetrically positioned with respect to the longitudinal axis of said magnetic recording head.

6. The magnetic recording head of claim 5 wherein said read-write gap is about 4 mils wide and said notch is about 3 mils wide.

7. The magnetic recording head of claim 4 wherein the depth of said notch is at least 10 times the depth of said erase gap, the depth of said erase gap being determined by the distance between said surface of said magnetic core having said notch therein and that surface of said end of said erase leg opposite therefrom.

8. The magnetic recording head of claim 4 further including a non-magnetic spacer within said read-write gap and a non-magnetic spacer within said erase gap.

9. The magnetic recording head of claim 4 wherein said central magnetic core and said plurality of legs are formed from a single unitary magnetic piece.

10. The magnetic recording head of claim 4 wherein each of said plurality of legs is a separate piece from said central magnetic core.

11. The magnetic recording head of claim 4 further including a pre-erase leg having a pre-erase coil disposed thereabout, said pre-erase leg positioned on the opposite side of said read-write leg from said central magnetic core, the end of said pre-erase leg adjacent the lower portion of said read-write leg being slightly spaced therefrom to define a pre-erase gap having a width at least equal to the width of said read-write gap whereby, upon energization of said pre-erase coil when said pre-erase gap is positioned adjacent a magnetic storage medium, the adjacent portions of said magnetic storage medium are brought to a substantially uniform state prior to the magnetic recording thereon of said data area of said first width.

12. The magnetic recording head of claim 11 further including a non-magnetic spacer within each of said pre-erase, read-write and erase gaps.

13. The magnetic recording head of claim 11 wherein each of said plurality of legs is a separate piece from said central magnetic core.

14. A magnetic recording head comprising a central magnetic core, a first substantially U-shaped leg disposed with the ends thereof adjacent a first surface of said magnetic core, the end of said first substantially U-shaped leg adjacent the lower portion of said first surface being slightly spaced therefrom to define a read-write gap, a second substantially U-shaped leg disposed with the ends thereof adjacent that surface of said magnetic core parallel to said first surface, the end of said second substantially U-shaped leg adjacent the lower portion of said magnetic core being slightly spaced therefrom to define an erase gap, said first substantially U-shaped leg being of a first predetermined width less than the width of said magnetic core thereby defining said read-write gap, said second substantially U-shaped leg being of a width greater than the width of said read-write gap thereby defining said erase gap, the surface of said magnetic core facing said erase gap having a notch in the lower portion thereof, said notch being of a width less than the width of said read-write gap, said notch being of sufficient depth into said magnetic core to eliminate the erasing capability of that portion of said erase gap opposite thereto.

15. The magnetic recording head of claim 14 further including a read-write coil disposed about said first substantially U-shaped leg, an erase coil disposed about said second substantially U-shaped leg, means to cause relative movement of said magnetic recording head and a magnetic storage medium positioned adjacent thereto, means to energize said read-write coil to magnetize an area on said magnetic storage medium, said magnetized area having a width substantially equaL to the width of said read-write gap, and means to energize said erase coil when said erase gap is positioned adjacent said magnetized area whereby those portions of said magnetized area between each end of said notch and the lateral end of said erase gap adjacent thereto are erased such that the width of said magnetized area is reduced substantially to the width of said notch.

16. The magnetic recording head of claim 14 wherein said read-write gap and said notch are symmetrically positioned with respect to the longitudinal axis of said magnetic recording head.

17. The magnetic recording head of claim 14 wherein said read-write gap is about 4 mils wide and said notch is about 3 mils wide.

18. The magnetic recording head of claim 14 wherein the depth of said notch is at least 10 times the depth of said erase gap, the depth of said erase gap being determined by the distance between said surface of said magnetic core having said notch therein and that surface of said end of said erase leg opposite therefrom.

19. The magnetic recording head of claim 14 wherein each of said first and second substantially U-shaped legs are formed from pieces distinct from said central magnetic core.

20. The magnetic recording head of claim 14 further including a third substantially U-shaped leg positioned on the opposite side of said read-write leg from said central magnetic core, the end of said third substantially U-shaped leg adjacent the lower portion of said read-write leg being slightly spaced therefrom to define a pre-erase gap, said pre-erase gap having a width at least equal to the width of said read-write gap.

21. The magnetic recording head of claim 20 further including a read-write coil disposed about said first substantially U-shaped leg, an erase coil disposed about said second substantially U-shaped leg, a pre-erase coil disposed about said third substantially U-shaped leg, means to cause relative movement of said magnetic recording head and a magnetic storage medium positioned adjacent thereto, means to energize said pre-erase coil to magnetize portions of said magnetic recording medium adjacent to said pre-erase gap to a substantially uniform condition, means to energize said read-write coil to magnetize an area in said conditioned portion of said magnetic storage medium to a first width substantially equal to the width of said read-write gap, and means to energize said erase coil when said erase gap is positioned adjacent said magnetized area whereby those portions of said magnetized area between each end of said notch and the lateral ends of said erase gap adjacent thereto are erased such that the width of said magnetized area is reduced substantially to the width of said notch.

22. The magnetic recording head of claim 20 wherein each of said first, second, and third substantially U-shaped legs are formed from pieces distinct from said central magnetic core.

* * * * *